Feb. 19, 1935.  B. DICK  1,991,603
BRAKING APPARATUS
Filed Jan. 2, 1932  2 Sheets-Sheet 1

Inventor
BURNS DICK
By E. E. Huffman
Att'y.

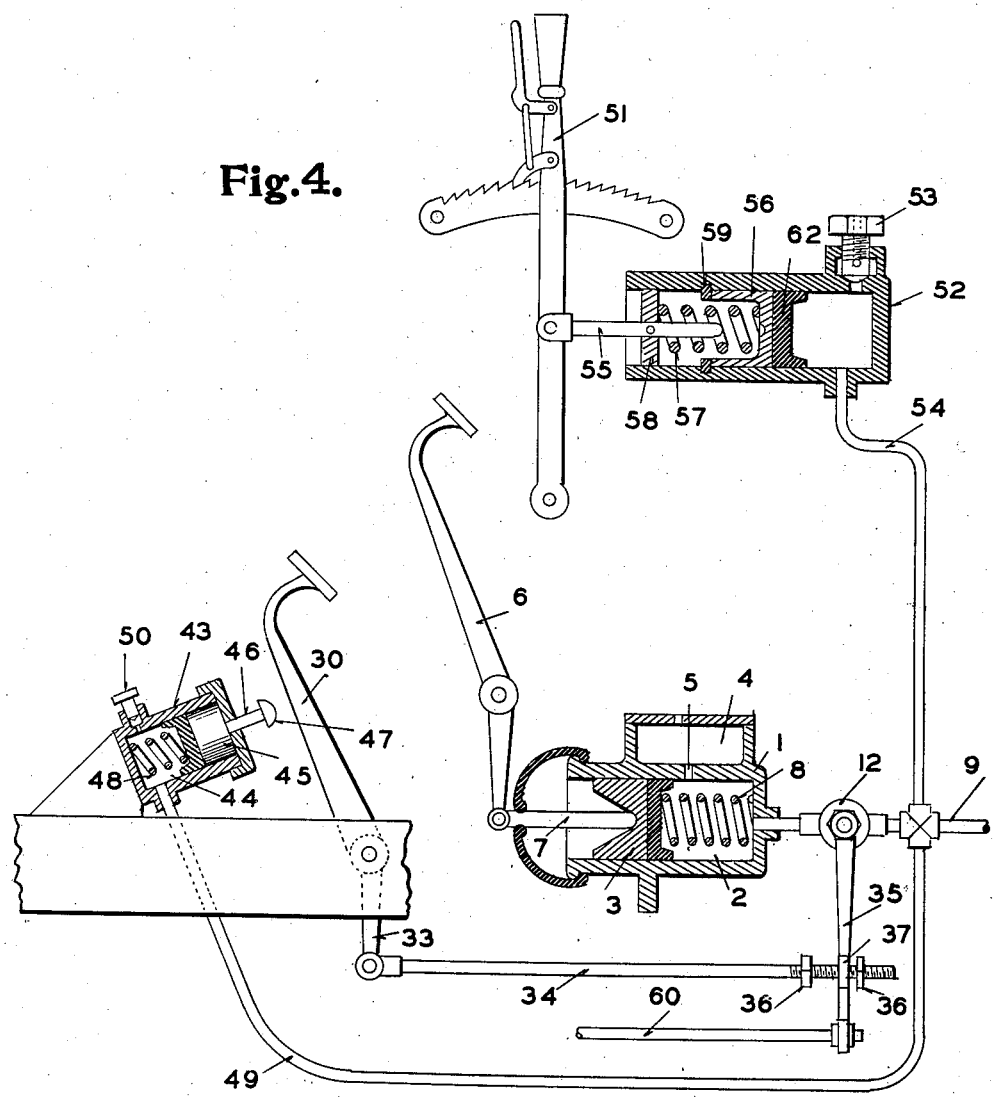

Patented Feb. 19, 1935

1,991,603

UNITED STATES PATENT OFFICE 1,991,603

BRAKING APPARATUS

Burns Dick, Ferguson, Mo., assignor to Wagner Electric Corporation, St. Louis, Mo., a corporation of Delaware Application January 2, 1932, Serial No. 584,363

11 Claims. (Cl. 192—13)

My invention relates to braking apparatus and especially to the control of the vehicle brakes by the brake and clutch pedals and the parking brake lever of the vehicle.

In motor vehicles which are equipped with means controlled by the clutch pedal for maintaining the brakes in applied position, it is difficult for the operator to stop the clutch pedal at the point in its travel where the clutch has been disengaged but the brake control mechanism has not been actuated and the natural tendency of the operator, in disengaging the clutch, is to move the clutch pedal to the full extent of its possible travel. It is, therefore, one of the objects of my invention to provide means for indicating to the operator the position of the clutch pedal that is necessary to disengage the clutch but not actuate the brake controlling means.

Another object of my invention is to combine with a hydraulic braking system provided with means for holding the brakes applied, an auxiliary means operated by the clutch pedal for applying additional pressure to the hydraulic brake system after the clutch has been disengaged.

Still another object of my invention is to provide, in a hydraulic braking system, expansible means adapted to maintain the brakes in applied position notwithstanding a slight reduction in volume of the fluid due to decrease in temperature or to slight leakage of the operating fluid.

Figure 1:
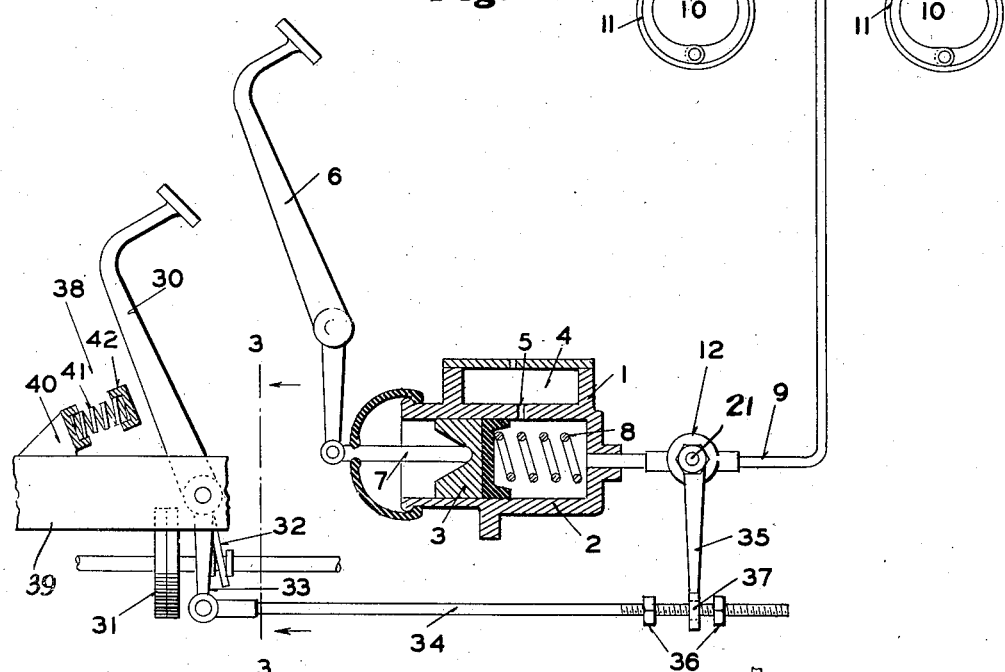
Figures 2, 3:
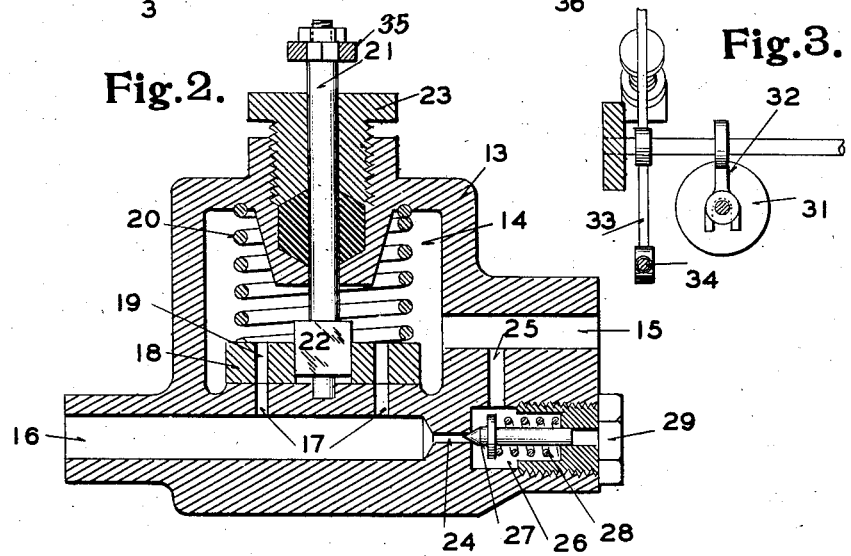

Other objects of my invention will become apparent from the following specification taken in connection with the accompanying drawings, in which Figure 1 is a view partially in section, disclosing my novel yieldable stop in combination with a clutch pedal operated mechanism for holding the brakes applied; Figure 2 is a cross sectional view of the valve mechanism of the braking system; Figure 3 is a view on the line 3—3 of Figure 1; and Figure 4 is a view partially in cross section, disclosing a combined yieldable stop and an auxiliary compressor actuated by the clutch pedal, and an auxiliary compressor actuated by the parking brake lever.

Referring to Figures 1, 2 and 3, the numeral 1 designates the fluid compressor of an hydraulic braking apparatus which is suitably attached to the frame of a motor vehicle. The compressor is provided with a cylinder 2 having a piston 3 reciprocable therein. A fluid reservoir 4 lies above the cylinder and is connected thereto by the port 5 adjacent the face of the piston in its non-operative position. The usual pivoted brake pedal 6 is connected to the piston by means of rod 7 and the piston is normally held in its non-operative position by means of a spring 8. A conduit 9 is connected to the cylinder and provides communication between the compressor and the wheel cylinders 10 for applying the shoes 11 in a well known manner.

Interposed in the conduit 9, between the compressor and the wheel cylinder, is a valve 12 the purpose of which is to cut off communication between the wheel cylinders and the compressor and at the same time allow the compressor to apply pressure to the wheel cylinders. The valve comprises a body member 13 provided with a chamber 14 connected by means of a channel 15 with the conduit element extending to the wheel cylinder. A channel 16, which is connected to the conduit element attached to the compressor, is also in communication with the valve chamber 14 by means of the ports 17. The bottom of the valve chamber is provided with a flat surface upon which a rotatable disc valve 18, having openings 19 therein, is adapted to be seated by a relatively strong spring 20. A valve stem 21 extends into the valve chamber and is provided with a square portion 22 cooperating with a square opening in the disc for turning the disc on its seat. A suitable packing gland 23 prevents any leakage around the valve stem.

The channels 15 and 16 of the valve are also connected together by means of the passages 24 and 25 and the bore 26. A conical valve 27 extends into the bore 26 and is seated against the walls of the passage 24 by means of a light spring 28. A bolt 29 closes the bore and also provides a support for the valve 27 and a backing for the spring. By means of this valve, fluid can flow from the channel 16 to the channel 15 but not in the reverse direction.

Adjacent the brake pedal 6 is pivotally mounted the usual clutch pedal 30 by which the clutch 31 between the engine and the transmission, can be engaged and disengaged by the clutch throwout lever 32. The lower end of the clutch pedal is extended beyond its pivot point to form a lever 33 to which is connected a rod 34, which in turn is connected by means of a lost motion connection to a lever 35 attached to the valve stem 21. The lost motion connection consists of spaced apart adjustable nuts 36 on the rod 34, one on each side of an opening 37 in the lever 35 through which the rod extends.

A yieldable stop 38, consisting of a base member 40, a coiled spring 41, and a head 42, is attached to a suitable part of the vehicle 39 so as to lie in the path of movement of the clutch lever 30. The head 42 of the stop is so spaced from the normal position of the clutch pedal that it is not engaged thereby until the pedal has disengaged the clutch 31.

In operation, the compressor, conduit, and wheel cylinders are completely filled with liquid. When the vehicle is in motion the parts are in the position shown, with the clutch engaged, the brakes released, and the ports 19 of the disc valve coinciding with the ports 17 connected with the channel 16. If the operator desires to apply the brakes, he pushes on the brake pedal which causes the piston to be moved toward the right, cutting off the passage 5 between the reservoir and the cylinder, and forcing liquid under pressure through the valve and conduit to the wheel cylinder, thereby applying the brakes. If the operator desires to throw out the clutch and at the same time keep the brakes applied without holding his foot upon the brake pedal (as would be desired, for example, when stopped on an incline), he may do so by pressing the clutch pedal 30 to its limit of travel. During the initial movement of the clutch pedal the lever 35, connected to the valve stem, will not be moved, due to the lost motion connection between it and the rod 34. The left nut 36 on the rod 34, however, is so adjusted that it will engage the lever 35 immediately after the clutch pedal disengages the clutch and contacts with the yieldable stop 38. The operator is, therefore, informed, by the engagement of the clutch pedal with the yieldable stop, that the clutch is disengaged and the disc valve 18 is about to be turned. Further movement of the clutch pedal against the yieldable stop will rotate the disc valve and cut off communication between the channels 15 and 16. Since the valve 27 is spring-pressed against its seat, no fluid will be able to flow from the channel 15 to channel 16 by way of the passages 25 and 24 and the pressure on the brakes will be maintained. The operator is then free to remove his foot from the brake pedal and use it for operating the accelerator or the starter. At this time if the operator desires to apply more pressure to the brakes, he may do so by pressing on the brake pedal to further move the piston in the compressor and force liquid through passages 24 and 25 by unseating the spring loaded valve 27. If the right foot is removed from the brake pedal and it is desired to release the brakes, the operator need only release the clutch pedal which will cause the right hand nut on rod 34 to engage lever 35 and move it back to normal position so that the channel 15 is in communication with the channel 16, by way of ports 19 and 17, previous to the re-engagement of the clutch.

It is also to be noted that if the clutch pedal is moved to extreme forward position, thereby disengaging the clutch and closing the disc valve 18, and it is desired to apply the brakes, the operator need only press on the brake pedal and fluid under pressure will be forced into the wheel cylinder from the master cylinder by way of passages 24 and 25 and the spring loaded valve 27. Whatever brake pressure is applied will be maintained, since the disc valve is then in position to prevent communication between channels 15 and 16.

By the use of the yieldable stop 38 the operator is informed as to the position of the cut-off valve. Also, if he desires to operate his clutch and brakes in the usual manner, the yieldable stop will inform him how far to move the clutch pedal to disengage the clutch and not operate the valve.

Referring to the apparatus illustrated in Figure 4, the cut-off valve 12 and its connection with the clutch pedal are the same as in Figures 1, 2 and 3. For the yieldable stop 38, however, an auxiliary compressor is substituted, its piston being operable by the clutch pedal and serving to supply a braking pressure in addition to constituting a means having the function of stop 38. This auxiliary compressor 43 comprises a cylinder 44, a piston 45, and a piston rod 46 extending outside the cylinder and provided with a head 47 lying in the path of movement of the clutch but spaced from the "clutch engaged" position of the pedal. When the clutch pedal engages the head 47 of the piston rod, resistance to further movement is afforded by the spring 48 which tends to maintain the piston in its normal position at the upper end of the cylinder. A fluid conduit 49 leads from the lower end of the cylinder 44 and is connected to the main conduit 9 of the braking system back of the cut-off valve 12. A bleeder valve 50 is also provided in the cylinder 44 for the expelling of air from the system.

A hand lever 51 may also be adapted to actuate a second auxiliary brake applying means if so desired, this means comprising a compressor 52 provided with a bleeder valve 53 and connected by a conduit 54 to the main conduit 9. The lever 51 is provided with a rod 55 for actuating the compressor piston 56. A relatively strong spring 57 is interposed between a shoulder 58 on the rod 55 and the piston and normally maintains the free end of the rod spaced from the piston. A stop 59, carried by the cylinder wall of the compressor, prevents the piston 56 from moving beyond a predetermined point.

For use in connection with the auxiliary brake applying means just described, I also provide the valve lever 35 with an actuating connection 60 for controlling the valve from a remote point, as for instance, the instrument board of the vehicle, so that there will be no communication between the conduit 54 and the main compressor 1 when the compressor 52 is actuated.

The use of a compressible connection between the actuating rod 55 and the piston, is found to be very advantageous especially when the compressor is used for a parking brake. When the piston is actuated and held in operated position by the lever 51, there is no danger of contraction of the fluid, due to reduction in temperature or slight leakage, causing a release of the brakes when the vehicle is parked for any length of time, as the spring 57 will at all times maintain approximately the desired pressure on the fluid. This same result may also be secured in the same manner by the use of a thick compressible rubber cup washer 62 on the head of the piston. When the piston is actuated, the washer will be compressed and if any contraction of the fluid takes place, the washer will expand and maintain a pressure on the fluid.

In the construction disclosed in Figure 4, the operator may operate the clutch and brake in the usual manner if it is so desired. When the clutch is disengaged, the operator will be informed of such by the engagement of the clutch pedal with the head 47 of the piston rod and at the same time will know that the cut-off valve is not operated. If the operator desires to hold the brakes applied, an additional movement of the clutch pedal against the piston rod will turn the cut-off valve 12 and prevent communication between the wheel cylinders and the main compressor. As soon as the cut-off valve is operated, any further movement of the clutch pedal will apply additional braking force to the brakes by the movement of piston 45 forcing fluid under pressure to the wheel cylinder. An advantage of this structure is its use in heavy traffic, where it is desirable to have the left foot on the accelerator and still have the clutch disengaged and a control over the brakes. In such a case the operator need only actuate the clutch pedal with his left foot, which will first cause the clutch to be disengaged and then the sequential operation of the cut-off valve and the compressor 43, to operate the brakes.

This construction is also useful in simplifying the braking control in descending hills, as the operator can throw out the clutch and apply braking power by the clutch pedal alone without the use of the brake pedal 6.

The auxiliary brake applying means described, is also very useful on heavy vehicles such as busses and trucks, since if the operator cannot secure sufficient braking power by exerting his maximum effort on the brake pedal 6, he may also actuate the clutch pedal 30 and the parking lever 51 to increase the braking pressure.

Having fully described my invention, what I claim as new and desire to secure by Letters Patent of the United States is:

1. In apparatus of the class described, the combination of a clutch pedal and a clutch operated thereby, a fluid braking system including a compressor and fluid actuated brakes, an auxiliary compressor in communication with the fluid braking system, and means for operating said auxiliary compressor from said clutch pedal after said clutch has been disengaged.

2. In apparatus of the class described, the combination of a clutch pedal and a clutch actuated thereby, a fluid braking system including a compressor and a brake actuating fluid motor, means in said system for preventing communication of fluid from said brake actuating motor to said compressor, a second compressor in communication with said braking system, a connection between said clutch pedal and said means for operating said means, and means for operating said second compressor from said clutch pedal, said first named means and said second compressor being operated after the clutch has been disengaged.

3. In apparatus of the class described, the combination of a clutch pedal and a clutch actuated thereby, a fluid compressor, a fluid actuated brake, a conduit connecting the compressor with the brake, a valve in said conduit, a second compressor connected to said conduit at a point between the valve and the brakes, a lost motion connection between said valve and the clutch pedal whereby said valve is actuated after the clutch is disengaged, and means for operating said second compressor by said clutch pedal after the clutch is disengaged.

4. In apparatus of the class described, the combination of a clutch pedal and a clutch actuated thereby, a brake, means for actuating said brake, auxiliary brake actuating means, and means for operating said auxiliary brake actuating means by said clutch pedal.

5. In apparatus of the class described, the combination of a clutch pedal and a clutch actuated thereby, a brake, means for actuating said brake, auxiliary brake actuating means, and means for operating said auxiliary brake actuating means by said clutch pedal after said clutch has been engaged, said brake actuating means and said auxiliary brake actuating means being operable either in conjunction with or independently of each other.

6. In apparatus of the class described, the combination of a fluid braking system including a main compressor and fluid actuated brakes, an auxiliary compressor in communication with the fluid actuated brakes, a lever, means operated by said lever for preventing communication of fluid from the auxiliary compressor to the main compressor, and means simultaneously operated by said lever for actuating said auxiliary brake applying means.

7. In apparatus of the class described, the combination of a clutch mechanism, a fluid actuated brake, a fluid compressor for actuating said brake, a second fluid compressor for actuating said brake, and means operable by the clutch mechanism for preventing communication of fluid pressure from said second compressor to said first named compressor.

8. In apparatus of the class described, the combination of a fluid actuated brake, a fluid compressor for actuating said brake, a second fluid compressor for actuating said brake, means for preventing communication of fluid pressure from said second compressor to said first named compressor, a lever for actuating said second compressor, a yieldable connection between said lever and the piston of the second compressor, and means for holding said lever in different operative positions.

9. In a motor vehicle provided with a clutch and a clutch pedal, the combination of a fluid actuated brake, a main fluid compressor for actuating said brake, and a pair of auxiliary fluid compressors for applying additional pressure to the fluid actuated brake, one of said auxiliary compressors being operable by the clutch pedal after the clutch has been disengaged.

10. In apparatus of the class described, the combination of a clutch and clutch actuating mechanism, a hydraulic braking system, means in said system for holding the brakes applied, means connected to said clutch actuating mechanism for operating said holding means after the clutch has been disengaged, and a yieldable resistance for cooperating with the clutch actuating mechanism after said clutch has been disengaged but before the holding means has been operated, said yieldable resistance comprising means for applying pressure to the braking system.

11. In apparatus of the class described, the combination of a fluid braking system including a compressor and a wheel cylinder, an auxiliary brake actuating means including a second compressor connected to said wheel cylinder, means for preventing communication of fluid pressure from the second named compressor to the first named compressor whereby said second named compressor may be operated to actuate the brakes independently of the first, and means for permitting the operation of the first named compressor simultaneously with the second named compressor.

BURNS DICK.